United States Patent
Granfors et al.

(10) Patent No.: US 9,772,409 B2
(45) Date of Patent: Sep. 26, 2017

(54) X-RAY DETECTOR ASSEMBLY

(71) Applicant: General Electric Company, Schenectady, NY (US)

(72) Inventors: Paul Granfors, Santa Clara, CA (US); James Liu, Salt Lake City, UT (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/984,184

(22) Filed: Dec. 30, 2015

(65) Prior Publication Data
US 2016/0187499 A1 Jun. 30, 2016

Related U.S. Application Data

(60) Provisional application No. 62/097,650, filed on Dec. 30, 2014.

(51) Int. Cl.
*G01T 1/20* (2006.01)
*G01T 1/24* (2006.01)

(52) U.S. Cl.
CPC .......... *G01T 1/2018* (2013.01); *G01T 1/2002* (2013.01); *G01T 1/24* (2013.01)

(58) Field of Classification Search
CPC .................................................. G01T 1/2018
USPC .......................................................... 250/362
See application file for complete search history.

(56) References Cited

U.S. PATENT DOCUMENTS

| 4,678,900 A * | 7/1987 | Nishioka | A61B 1/05 250/205 |
| 6,262,408 B1 * | 7/2001 | Izumi | H01L 27/14676 250/208.1 |
| 6,614,180 B1 * | 9/2003 | Francke | G01T 1/2018 250/361 R |
| 6,621,616 B1 * | 9/2003 | Bauer | H01L 31/0203 250/338.4 |
| 2002/0090192 A1 | 7/2002 | O'Brien et al. | |

(Continued)

FOREIGN PATENT DOCUMENTS

WO 00-08689 A1 2/2000

OTHER PUBLICATIONS

International Search Report and Written Opinion for International Application No. PCT/US2015/068072, mail date Mar. 23, 2016. 3 pages.

*Primary Examiner* — David Porta
*Assistant Examiner* — Abra Fein

(57) ABSTRACT

An X-ray detector assembly comprising a light attenuator of electro-chromic material, the electro-chromic material having a first electrode layer electrically coupled to a first surface of the electro-chromic material and a second electrode layer electrically coupled to a second surface of the electro-chromic material, wherein the second surface is disposed opposite the first surface, and the light attenuator having a controllable light transmission rate. The X-ray detector further comprising a scintillator deposited on the first electrode layer and a photo detector deposited on the second electrode layer. The photo detector having a sensing surface adjacent to the second electrode layer of the light attenuator. A variable power supply is electrically coupled to the first and second electrode layers of the light attenuator to provide a controllable voltage across the first and second electrode layers to control the light transmission rate of the light attenuator in real time.

2 Claims, 5 Drawing Sheets

(56) References Cited

U.S. PATENT DOCUMENTS

| | | | |
|---|---|---|---|
| 2004/0026625 A1 | 2/2004 | Arakawa | |
| 2006/0118728 A1* | 6/2006 | Phlips | G01T 1/24 250/370.01 |
| 2006/0283952 A1* | 12/2006 | Wang | G06K 7/10722 235/462.01 |
| 2007/0176109 A1* | 8/2007 | Bell | G01T 1/2018 250/370.09 |
| 2009/0039277 A1 | 2/2009 | Iwakiri | |
| 2009/0065705 A1* | 3/2009 | Fuchs | G21K 4/00 250/370.11 |
| 2012/0326044 A1* | 12/2012 | Ghelmansarai | G01T 1/16 250/370.07 |
| 2013/0221195 A1* | 8/2013 | Kennedy | H01L 27/14618 250/208.1 |
| 2013/0271811 A1* | 10/2013 | Lam | E06B 9/24 359/266 |

* cited by examiner

X-RAY DETECTOR ASSEMBLY

CROSS-REFERENCE TO RELATED APPLICATIONS

This application claims the benefit of U.S. Provisional Patent Application No. 62/097,650, filed Dec. 30, 2014, the entirety of which is incorporated herein by reference.

BACKGROUND

The invention generally relates to a digital X-ray detector assembly, and in particular to digital X-ray detector panels.

The use of digital radiological imaging continues to be invaluable with respect to a variety of technical applications. Digital radiological imaging is a mainstay in the medical field allowing health care professionals to quickly discern and diagnose internal abnormalities of their patients. Additionally, its use has become increasingly important in industrial fields for visualizing internal contents of parts, baggage, parcels, and other objects, and for visualizing the structural integrity of objects and other purposes. Indeed, the evolution of digital X-ray detectors has enhanced both workflow and image quality in the field of radiological imaging.

Generally, radiological imaging involves the generation of X-rays that are directed toward an object of interest. The X-rays pass through and around the object and then impact an X-ray film, X-ray cassette, or digital X-ray detector. In the context of the digital X-ray detector, these X-ray photons traverse a scintillator that converts the X-ray photons to visible light or optical photons. The optical photons then collide with the photo detectors of a digital X-ray receptor and are converted to electrical signals which are then processed as digital images that can be readily viewed, stored, and/or transmitted electronically.

The conversion factor (CF) is a quality measurement of digital X-ray detectors that is generally recognized in the industry. It is defined as the number of electrons generated by the detector per incident X-ray photon. The value of CF varies depending on the energy of the X-ray photon as well as the light efficiency of the X-ray detector.

In low dose applications, such as fluoroscopic imaging, CF is generally higher than some other applications to reduce the impact of electronic noise. In high dose applications such as radiographic imaging, however, we need to control the CF in order to cover a required dynamic range of radiation dosage.

Considering the variability of CF for the various applications, each application requires a dedicated detector type because for a given X-ray photon energy, existing X-ray detectors have a fixed CF. In X-ray systems, such as a Radiography and Fluoroscopy (R&F) system, for instance, a value of CF is generally selected to balance the low dose performance in fluoroscopic imaging and the dynamic range in radiographic imaging. As a result, the compromised value of CF is neither optimal for fluoroscopic imaging nor radiographic imaging. Consequently, there is still a need for a technology that is able to change the value of CF in a single detector on demand in order to accommodate the various digital radiological imaging applications.

It has been determined that by placing a light attenuator between the X-ray scintillator and the light imager of an X-ray detector panel and applying varying voltage across the one or more pairs of electrodes of the light attenuator, the CF can be dynamically controlled and allow a single X-ray detector to accommodate multiple applications of digital radiological imaging.

It has also been determined that a light attenuator made of core material surrounded by clad material that is the same or similar to a fiber optic plate (FOP) helps prevent light photons from laterally spreading through the light attenuator and therefore improving the spatial resolution of the X-ray detector.

It has also been determined that by utilizing a two-dimensional (2D) pixel array with a light attenuator, the CF of the X-ray detector can be controlled by changing the light transmission rate of the light attenuator locally on a pixel by pixel basis, and thereby preserve the skin line of the anatomy and eliminate image burnout.

SUMMARY

Therefore, the invention is directed to an X-ray detector assembly that has a scintillator, a photo detector with a sensing surface, and a light attenuator that has a controllable light transmission rate and is located between the scintillator and the sensing surface of the photo detector.

In another embodiment, a method of varying a light attenuation rate of a digital detector by: (a) converting x-ray photons into visible light photons; (b) passing the visible light photons through an electro-chromic layer; and (c) applying a voltage across the electro-chromic layer wherein varying the voltage is capable of varying an attenuation of at least a portion of the visible light passing across the electro-chromatic layer.

An X-ray detector assembly that has a scintillator, a light photo detector with a sensing surface; and a light attenuator that has a controllable light transmission rate and is located between the scintillator and the sensing surface of the light photo detector wherein the light attenuator comprises a pixel array capable of changing light transmission rate from pixel to pixel.

The present invention provides for substantial reductions in manufacturing costs by making it possible for a universal X-ray detector to be used in multiple types of product that requires different dynamic CF ranges.

The present invention also provides for patient safety improvements by allowing clinicians adjust the CF in real time or otherwise on demand for specific patient applications and thereby avoid over-exposing a patient to unnecessary ionizing radiation.

The present invention also provides for improved image quality by preserving the skin line of the anatomy and reducing image burnout often found in X-ray medical imaging.

The present invention also provides for improved clinical workflow efficiencies by allowing clinicians to avoid swapping out different types of detectors when taking X-ray medical images of patient, particularly when utilizing mobile X-ray units.

DETAILED DESCRIPTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
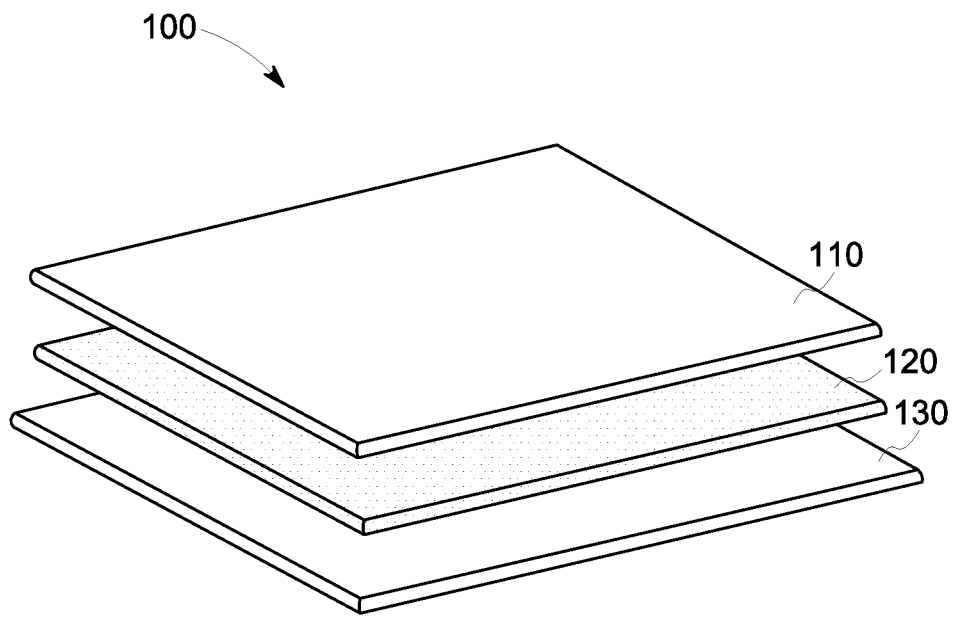
FIG. 1 is an exploded view of an X-ray detector panel according to an exemplary embodiment.

FIG. 1 is an exploded view of an X-ray detector panel 100 according to an exemplary embodiment. Referring to FIG. 1, an X-ray detector panel 100 includes a scintillator 110, a photo detector array 130 and a light attenuator 120 disposed between the photo detector 130 array and the scintillator 110. In a preferred embodiment, the X-ray detector panel 100 is preferably intended for use in a digital X-ray detector.

The scintillator 110 converts X-ray photons into visible light photons. In a preferred embodiment, the scintillator 110 comprises ionic materials, such as cesium iodide (CsI). However, other suitable ionic materials, for example, cesium iodide crystals doped with thallium (CsI:Tl), thallium doped sodium iodide (NaI:Tl), cesium iodide crystals doped with sodium (CsI:Na), lanthanum bromide (LaBR$_3$), cerium iodide (CeI), gadolinium oxysulfide, and lutetium oxide (Lu$_2$O$_3$), may be used in the scintillator 110.

Referring again to FIG. 1, the photo detector array 130 may be made of crystalline silicon, such as complementary metal-oxide semiconductor (CMOS) wafers, amorphous silicon or organic materials or a combination of the foregoing. In a preferred embodiment, the photo detector array 130 comprises of a plurality of photodiodes which absorb visible light photons from the scintillator 110 and convert the visible light into corresponding electrical signals, which may then be used to generate an X-ray image. Any technique known in the art may be used to generate the X-ray image from the electrical signals. Also, in other implementations, any other types of transducers may be used for converting the incident visible light into appropriate electrical output signals.

Figure 2:
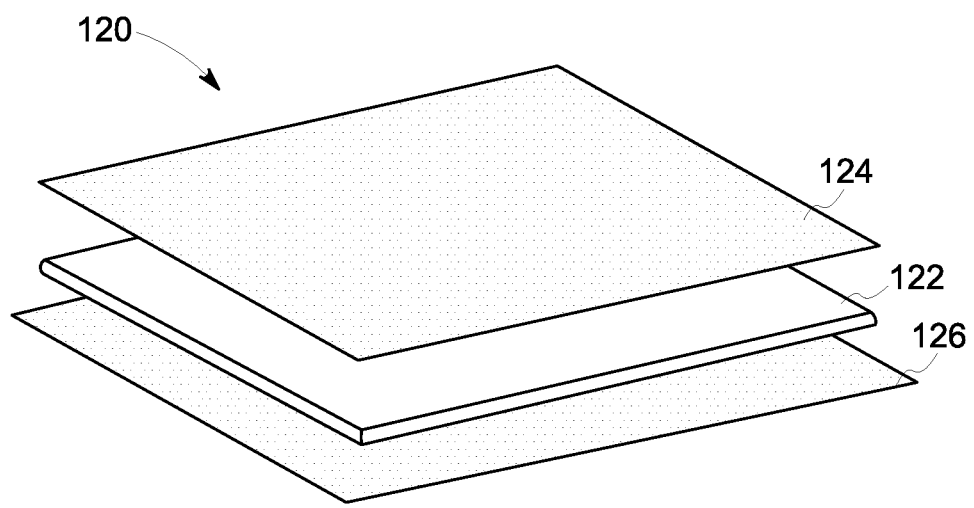
FIG. 2 is an exploded view of a light attenuator of the X-ray detector panel of FIG. 1.

FIG. 2 is an exploded view of a light attenuator 120 of the X-ray detector panel 100 of FIG. 1. Referring now to FIG. 2, the light attenuator 120 includes an electro-chromic layer 122. The electro-chromic layer 122 may be made of any electro-chromic material, such as tungsten oxide, NiO, polyaniline, viologens, polyoxotngstates, etc. In a preferred embodiment, an electrode layer 124 is deposited on a top surface of the electro-chromic layer 122 and an electrode layer 126 is deposited on a bottom surface of the electro-chromic layer 122. For instance, in a preferred embodiment, as depicted in FIG. 2, a first electrode layer 124 and a second electrode layer 126 are deposited on opposing first and second surfaces (i.e., top and bottom) of the electro-chromic layer 122. The electrode layers, including the first electrode layer 124 and the second electrode layer 126, may comprise, for example, an indium tin oxide (ITO) or the like. However, any substance that is optically transparent, electrically conductive and capable of being deposited on a surface of the electro-chromic layer 122 may be suitable for the electrode layers. Although in a preferred embodiment the electrode layers are preferably applied on both surfaces of the electro-chromic layer in order to apply a voltage across the electro-chromic materials, the two electrode layers do not have to be the same. For instance, in a preferred embodiment, one of the electrode layers may comprise of a single piece of ITO and the other electrode layer may comprise of a two-dimensional pixel array so as to apply different voltages from pixel to pixel. In another embodiment, the electro-chromic layer 122 may include a liquid crystal instead of an electro-chromic material. The light attenuator 120 may be applied directly on the photo detector 140, scintillator 110 or both. Alternatively, the light attenuator 120 may be applied, incorporated or embedded onto an optically transparent physical substrate, such as glass or fiber optical plate (FOP), forming a standalone part that can be assembled between the scintillator 110 and the photo detector 140.

Figure 3A:
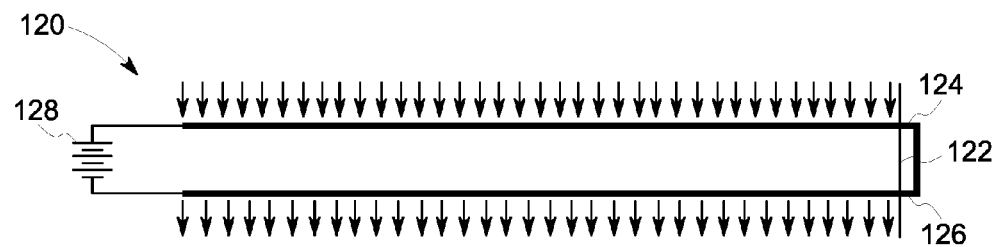
FIG. 3A is a cross-sectional diagram illustrating the light attenuator of FIG. 2 having a high light transmission rate.

FIG. 3A is a cross-sectional diagram illustrating the light attenuator 120 of FIG. 2 having a high light transmission rate. Referring now to FIG. 3A, a depiction is made of a preferred light attenuator 120 having a high light transmission rate. Generally, the light transmission rate of light attenuator 120 may be varied by applying a varying voltage from a power supply 128 across the electrode layers 124, 126. The voltage may be applied by a controllable and variable power supply having a voltage source known in the art. Depending on the application, the voltage applied across the electrode layers 124, 126 may be of any voltage suitable for applications in digital X-ray imaging, including but not limited to fluoroscopic imaging, radiographic imaging, and interventional imaging. However, in a preferred environment, the voltage applied across the electrode layers 124, 126 is not greater than 10 volts DC, and more preferably not greater than about 5 volts DC for best results. As the voltage increases across the electrode layers 124, 126, the light transmission rate of the light attenuator generally increases. As the light transmission rate of the light attenuator increases, the CF of the digital X-ray detector increases, and as the light transmission rate of the light attenuator decreases, the CF of the digital X-ray detector decreases. Therefore, the subject invention allows for variable control of the CF for digital X-detectors, allowing for a single digital X-ray detector to be suitable for a wide range of digital X-ray applications, including fluoroscopic, radiographic, and interventional imaging, etc.

To obtain an appreciation for the variability in the CF for various digital X-ray applications, in a preferred embodiment using an amorphous silicon-based detector for fluoroscopic applications, the CF is generally higher than radiographic imaging applications and preferably is at least about 1200 electrons/photon, but no greater than about 1600 electrons/photon. In a preferred embodiment using an amorphous silicon-based detector for radiographic imaging applications, the CF is preferably less than 1200 electrons/photon, and preferably between 400 electrons/photon and 800 electrons/photon, and most preferable around 600 electrons/photons for best results. For CMOS based X-ray detectors, the CF can be substantially lower than the foregoing exemplary because the CMOS based X-ray detectors have relatively lower electronic noise, which allows the CF to generally be lower than amorphous silicon based detectors.

In a preferred embodiment, the electro-chromic layer of the light attenuator is structured to prevent light photons from laterally spreading across the horizontal axis of light attenuator.

Figure 3B:
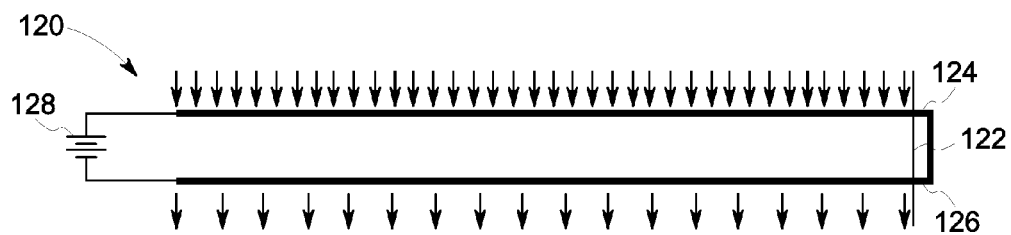
FIG. 3B is a cross-sectional diagram illustrating the light attenuator of FIG. 2 having a low light transmission rate.

FIG. 3B is a cross-sectional diagram illustrating the light attenuator 120 of FIG. 2 having a low light transmission rate. Referring now to FIG. 3B, a depiction is made of a preferred light attenuator 120 having a low light transmission rate. Generally, the light transmission rate of light attenuator 120 may be varied by applying a varying voltage from a power supply 128 across the electrode layers 124, 126. The voltage may be applied by a controllable and variable power supply having a voltage source known in the art.

Figure 4:
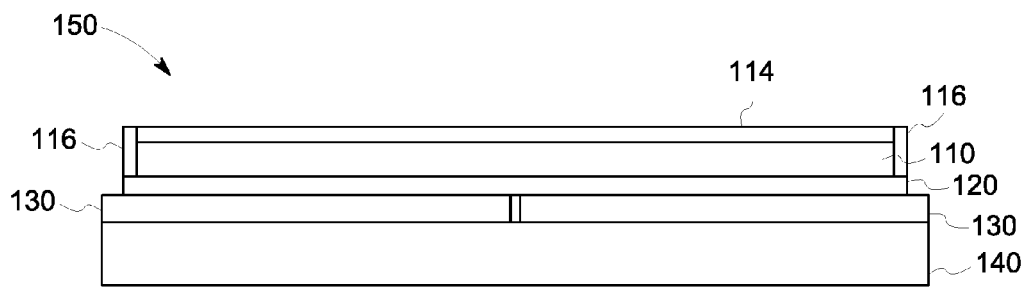
FIG. 4 is a cross-sectional view of the internal structure of an X-ray detector assembly according to another exemplary embodiment.

FIG. 4 is a cross-sectional view of the internal structure of an X-ray detector assembly 150 according to an exemplary embodiment. In an exemplary embodiment, the X-ray detector assembly 150 includes the X-ray detector panel 100, which includes a scintillator 110, a light attenuator 120, and a photo detector array 130. As mentioned with reference with FIG. 2, the light attenuator 120 includes an electro-chromic layer 122 made of any electro-chromic material with a first electrode layer 124 deposited on a top surface of the electro-chromic layer 122 and a second electrode layer 126 deposited on a bottom surface of the electro-chromic layer 122. The scintillator 110 is preferably deposited onto a surface of the light attenuator 120. In an exemplary embodiment, the scintillator 110 is sealed with a scintillator cover 114 and a sealing epoxy 116 enclosing the scintillator 110. In a preferred embodiment, the photo detector array 130 may be made of crystalline silicon, such as a plurality of complementary metal-oxide semiconductor (CMOS) wafers that are tiled onto a surface of the light attenuator 120, opposite to the surface of the scintillator 110, with the sensing surface of the CMOS wafers towards the light attenuator. The opposite side of the photo detector array 130 is supported by a panel support 140 that provides some structure to the X-ray detector panel 100. Missing from the diagram of FIG. 4 is electronic circuitry that is preferably disposed on at least one circuit board and an enclosure enclosing the components of the X-ray detector assembly 150.

Figure 5:
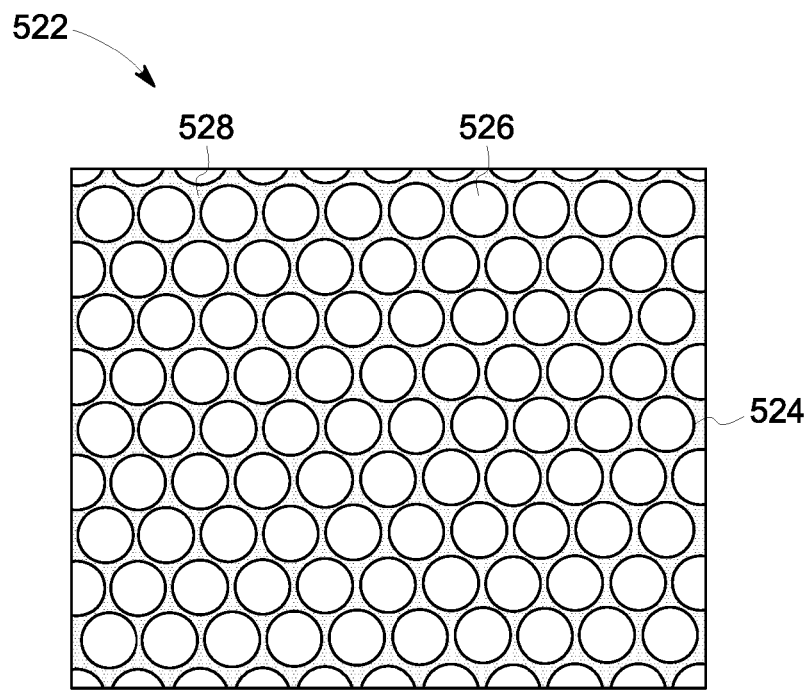
FIG. 5 is a top view of a light attenuator according to another exemplary embodiment.

FIG. 5 is a top view of a light attenuator 522 according to another exemplary embodiment. In order to prevent light photons from spreading laterally and improving spatial resolution, the light attenuator 522, including the electro-chromic layer 524, may be structured as a fiber optic plate (FOP) or other similar structure with a core 526 made of an electro-chromic material surrounded by a clad 528. The clad 528 may be of any material with a light refraction index suitable to obtain the total internal reflection of the light photons within the core 526. In a preferred embodiment, in order to optimize the light transmission rate without negatively impacting the special resolution of the X-ray detector, the diameter of the core 526 is preferably between about 4 μm to about 20 μm, and about 6 μm for best results. The cross-section shape of the core 526 can be circular, hexagon, square, squircle, etc. As can be appreciated by those of ordinary skill in the art, the cross-section shape of the core 526 and pattern of the clad 528 is not so limited by the shape and pattern set forth in FIG. 5, but can be any shape and structure that prevents photons from laterally spreading across the horizontal axis of the light attenuator.

Figure 6:
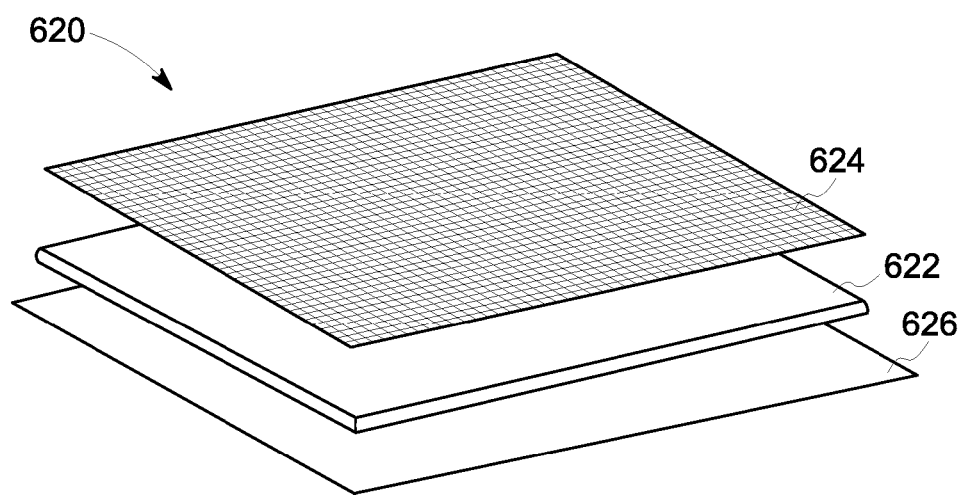
FIG. 6 is an exploded view of a light attenuator of an X-ray detector panel according to another exemplary embodiment.

FIG. 6 is an exploded view of a light attenuator 620 of an X-ray detector panel according to another exemplary embodiment. In a preferred embodiment, an electrode layer of the light attenuator 620 comprises a pixel array 624 electrically coupled to one or more surfaces of an electro-chromic layer 622 and preferable the top surface of the electro-chromic layer 622. Preferably, the pixel array 624 is a two-dimensional (2D) pixel array with each pixel comprising a thin film transistor and a charge storage capacitor to achieve the variable voltage applied across the light attenuator 620 from pixel to pixel to allow for CF control on an individual basis. The light attenuator 620 also preferably includes an electrode layer 626 deposited on a bottom surface of the electro-chromic layer 622. The pixel array 624 is similar to a liquid crystal display (LCD) panel so as to control the light transmission rate locally. A major benefit of pixel-by-pixel CF control is to reduce the impact of image burnout.

Figure 7:
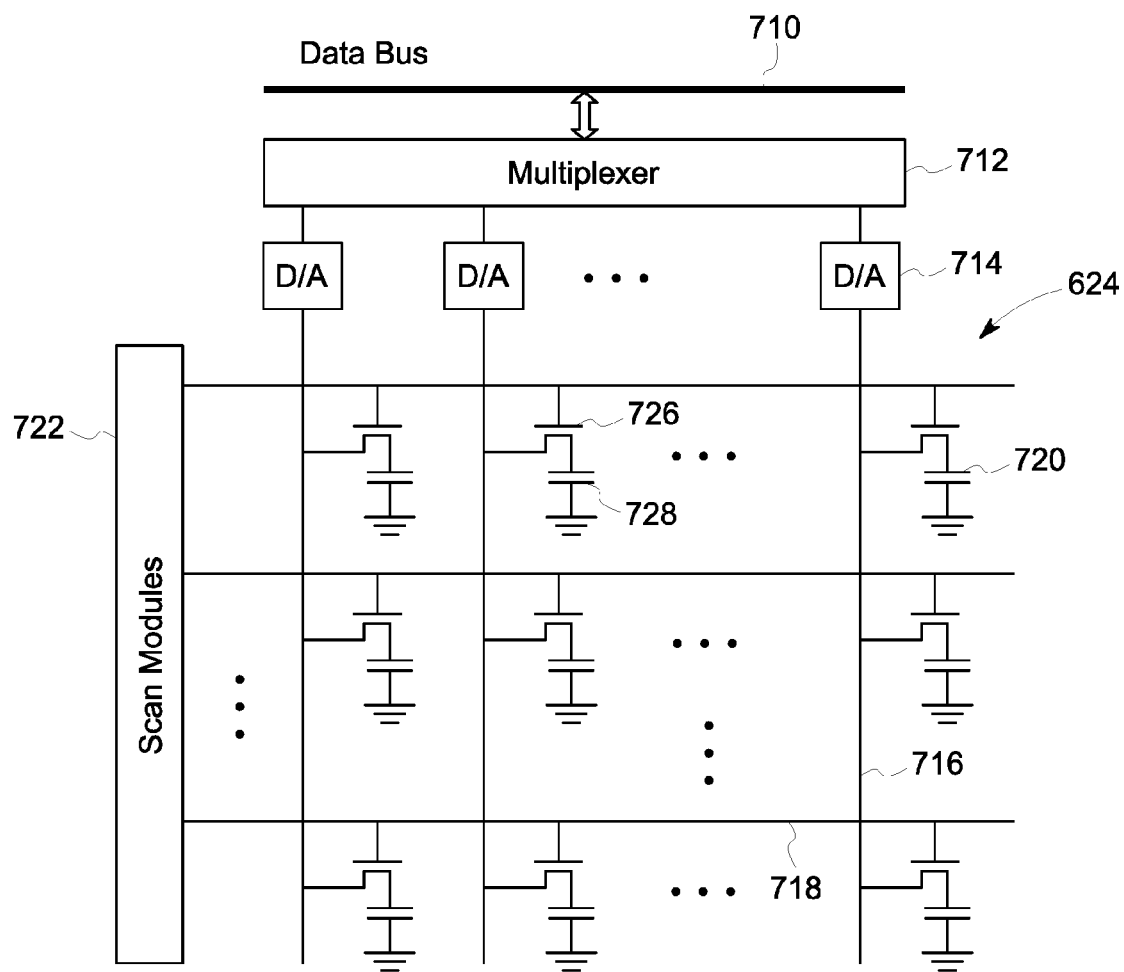
FIG. 7 is an electrical block diagram of a portion of the light attenuator of FIG. 6.

FIG. 7 is an electrical block diagram of a portion of the light attenuator 620 of FIG. 6, and in particular the pixel array 624. The pixel array 624 comprises an array of pixels 720 arranged in columns 716 and rows 718 allowing the pixels to be accessed individually. FIG. 7 illustrates the capability of accessing each individual pixel and changing the voltage on each individual pixel. In a preferred embodiment, all the pixels 720 in a column are connected to a common column data line 716 and all of the pixels in a row are coupled to a row select scan line 718.

Preferably, each pixel 720 includes a thin film transistor (TFT) 726 working as a switch and a storage capacitor 728. The capacitor 728 is used to hold the voltage applied to the pixel 720 between consecutive charges (i.e. applied voltage). The gates of the TFTs 726 in a row are coupled to the row select scan line 718. The sources of the TFTs 726 in a column are coupled to the common column data line 716. The drains of the TFTs 726 are coupled to the capacitors 728. The TFT 726 is used to select a row 718 of the pixel array 624 to access. The capacitor 728 is designed to hold the voltage applied to the pixel 720 between two consecutive refreshes.

The accessibility of the individual pixels 720 is achieved by a row select scan line 718 and a common column data line 716. The common column data line 716 connects all of the pixels 720 in the same column of the pixel array 624. The row select scan line 718 is used to select a desired row of pixels 720 to be read out, while the common column data line 716 is used to address one column at a time. The common column data line 716 sequentially addresses all of the columns during the period when their row is being addressed by the row select scan line 718. Each of the common column data lines 716 are coupled to a digital to analog converter 714, which is coupled to a multiplexer 712 and a data bus 710. Each of the row select scan lines 718 are coupled to scan modules 722.

Figure 8:
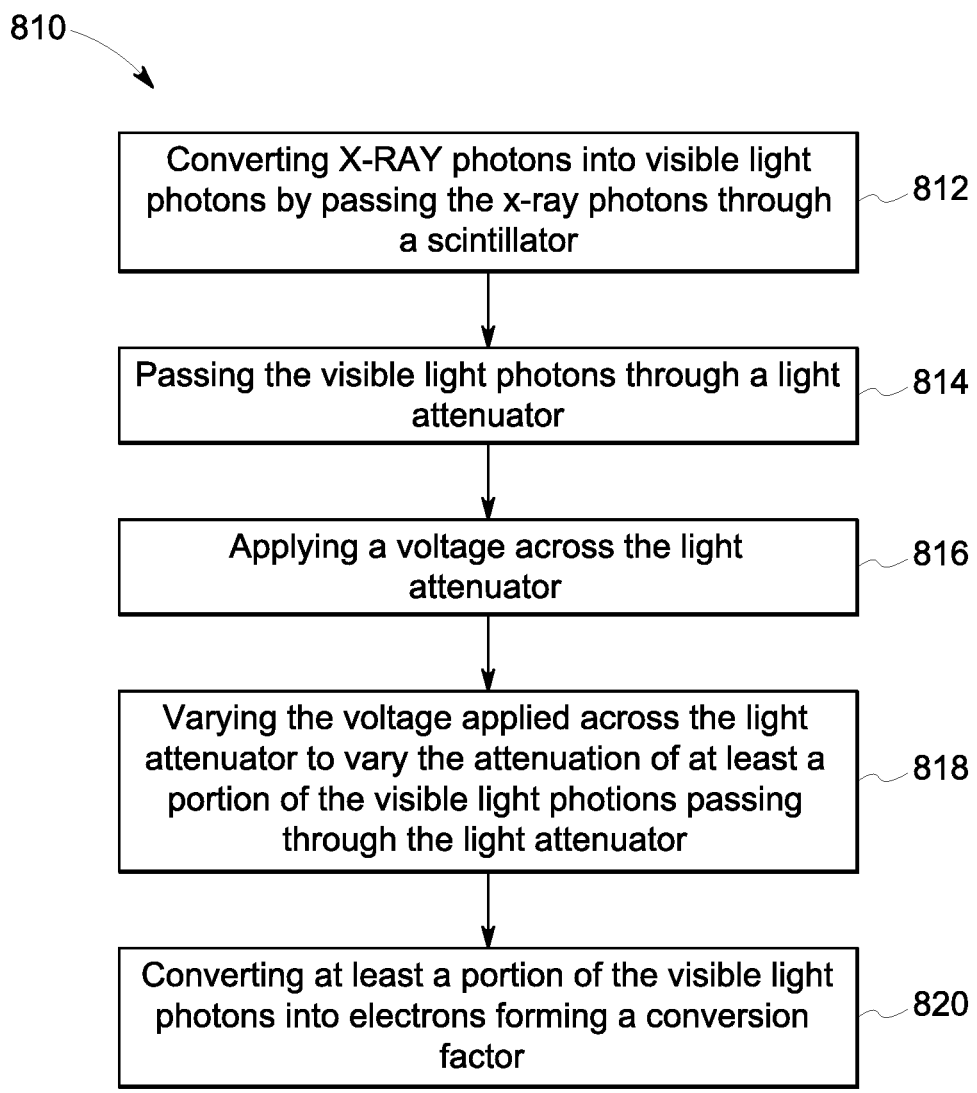
FIG. 8 is a flow diagram illustrating a method of varying the light attenuation of an X-ray detector according to an exemplary embodiment.

FIG. 8 is a flow diagram illustrating a method 810 of varying the light attenuation of an X-ray detector according to an exemplary embodiment. The method 810 comprising in a first step 812 of converting X-ray photons into visible light photons by passing the X-ray photons through a scintillator. In a next step 814, the visible light photons are passed through a light attenuator. The light attenuator comprising a first electrode layer, an electro-chromic layer of electrochromic material, and a second electrode layer. In another step 816, a voltage is applied across the first and second electrode layers of the light attenuator, and the voltage is varied in a step 818 to vary the attenuation of at least a portion of the visible light passing through the light attenuator. The method further comprises a final step 820 of converting at least a portion of the visible light photons into electrons, forming a conversion factor. The conversion factor may preferable be between about 1200 electrons per X-ray photon and 1600 electrons per X-ray photon. The conversion factor may also be less than 1200 electrons per X-ray photon.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Various features of the invention are set forth in the following claims.

We claim:

1. A method of varying a light attenuation rate of an X-ray detector, the method comprising the steps of:
    converting X-ray photons into visible light photons by passing the X-ray photons through a scintillator;
    passing the visible light photons through a light attenuator, wherein the light attenuator comprises a first electrode layer, an electro-chromic layer of electrochromic material, and a second electrode layer;
    applying a voltage across the first and second electrode layers of the light attenuator;
    varying the voltage applied across the first and second electrode layers to vary the attenuation of at least a portion of the visible light passing through the light attenuator in real time;
    converting at least a portion of the visible light photons into electrons, forming a conversion factor; and
    wherein the conversion factor is between about 1200 electrons per X-ray photon and 1600 electrons per X-ray photon.

2. A method of varying a light attenuation rate of an X-ray detector, the method comprising the steps of:
    converting X-ray photons into visible light photons by passing the X-ray photons through a scintillator;
    passing the visible light photons through a light attenuator, wherein the light attenuator comprises a first electrode layer, an electro-chromic layer of electrochromic material, and a second electrode layer;
    applying a variable voltage across the first and second electrode layers of the light attenuator;
    adjusting the voltage applied across the first and second electrode layers to vary the attenuation of at least a portion of the visible light passing through the light attenuator in real time; and
    converting at least a portion of the visible light photons into electrons, forming a conversion factor; and
    wherein the conversion factor is between 1200 electrons per X-ray photon and 1600 electrons per X-ray photon.

* * * * *